Aug. 9, 1949.                  C. G. NELSON                    2,478,887
                           CRADLE FOR FLAT BATTERIES
Filed Aug. 19, 1948                                         2 Sheets-Sheet 1

INVENTOR.
CLIFFORD G. NELSON.
BY Beale and Jones
ATTORNEYS.

Aug. 9, 1949.  C. G. NELSON  2,478,887
CRADLE FOR FLAT BATTERIES
Filed Aug. 19, 1948  2 Sheets-Sheet 2

INVENTOR.
CLIFFORD G. NELSON.
BY *Beale and Jones*
ATTORNEYS.

Patented Aug. 9, 1949

2,478,887

UNITED STATES PATENT OFFICE 2,478,887

CRADLE FOR FLAT BATTERIES

Clifford G. Nelson, Stoughton, Wis., assignor to Ray-O-Vac Company, Madison, Wis., a corporation of Wisconsin Application August 19, 1948, Serial No. 45,145

11 Claims. (Cl. 136—173)

This invention relates to cradles or supports for dry cell batteries and in particular dry cells which have both terminals at one end of the battery and in which the battery preferably is so shaped or flattened as to have a pair of relatively wide sides and a pair of relatively narrower edges. With more particularity the invention relates to such a holder wherein the polarity of the current from the holder will not be changed regardless of which side of the battey is placed in operative position on the holder.

There has been developed within the recent past a type of dry cell battery formed of a plurality of superimposed stacks of relatively flat disc-like cells. When said stacks are placed side-by-side and provided with a suitable sheath or covering it is possible to arrange the connections between the individual cells in such a manner that both the positive and the negative battery terminals are positioned at the same end of the battery. This is contrasted with the conventional cylindrical dry cell battery which has a central polar terminal at one end and wherein the base of the metallic container or sheath provides the other terminal.

The relatively newer multiple-stacked, multiple-cell batteries have a number of desirable characteristics, one of which is that they may be shaped in an approximation of a flattened rectangular plate, having rounded or angular corners as desired. By virtue of their shape such flattened batteries may be used in small, compact devices such as pocket radio sets, portable or pocket hearing aid sets and the like, wherein the bulk of the container must be minimized. The conventional cylindrical dry cell battery occupies too much bulk and because of its end-to-end terminal connections requires the provision of circuit connections which also use up space within the set container.

Pocket battery sets, portable, pocket hearing aid sets and the like can be, and have been designated in small, compact containers adapted to use the flattened, multiple-cell, multiple-stacked batteries discussed above. In such devices the feature of employing such a battery, or such batteries, presents no great problem to those skilled in the art, once the device has been designed. However, provision must be made for the replacing of discharged batteries with fresh ones and careful consideration must be given to the lack of knowledge of electricity and electrical devices which characterizes many if not most of the users of such devices. The aged, infirm, or electrically ignorant are not capable of distinguishing between the positive and the negative terminals of a battery.

This invention is aimed at making it possible for the user of a compact, pocket radio, or portable hearing aid or the like, to replace a discharged battery with a fresh battery without reversing the terminals or polarity regardless of how he installs the battery and without regard to his lack of electrical knowledge.

It is an object of this invention therefore to provide a cradle or support for a dry cell battery which has both terminals at one end of the battery. A further object is to provide such a cradle possessing battery terminal connections which insure constant polarity regardless of how the battery is placed on the cradle. A still further object is the provision of a cradle or support which will hold a battery in operative position, yet permit its removal with ease and permit its replacement with a fresh battery without danger of reversing the polarity of the current due to improper installation of the fresh battery.

Other objects will be apparent from the following description and with reference to the attached drawings wherein like reference numerals refer to like or similar elements. In the drawings.

Figure 1:
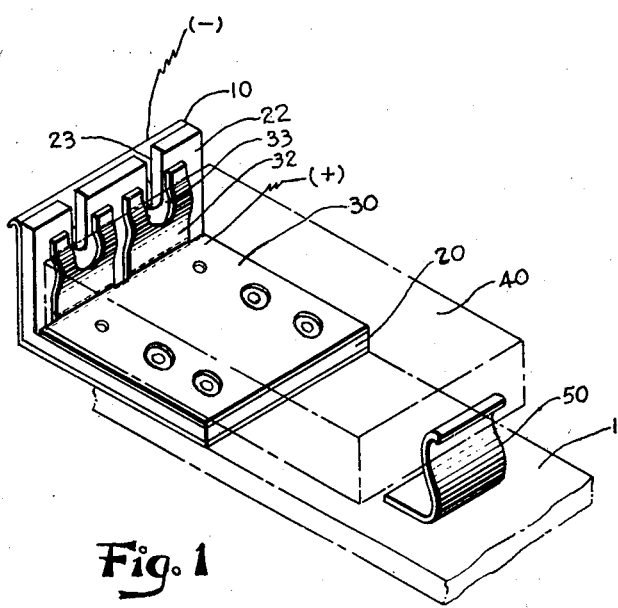
Figure 1 is a perspective assembly view of a holder for a dry cell.
Figure 2:
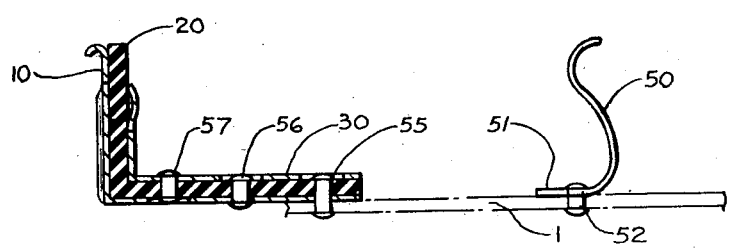
Figure 2 is a side elevational view partly in cross-section of the assembly of Figure 1.

In the embodiment illustrated in the figures of the drawings and in particular of Figures 1 and 2, 1 represents a base which may be any desired surface in a vertical or horizontal plane and which may be a shelf, table-top or any other similar fixed support or which may be part of a receptacle or closure for hearing aids, or radios and, in fact, any structure in which it is desirable to insert one or more battery cells. Suitably mounted on the base 1 is a constant polarity contact unit formed of contact plate 10, insulating plate 20 and contact plate 30. Mounted on support 1, at a predetermined distance from the contact unit is a spring member 50.

Figures 4, 5, 6:
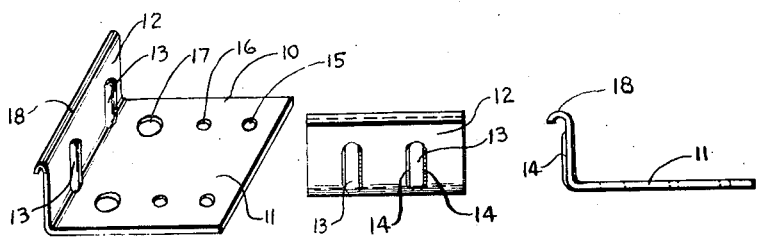
Figure 4 is a perspective view of one of the contact plates.
Figure 5 is an end view of the plate shown in Figure 4.
Figure 6 is a side elevational view of the same plate.
Figures 7, 8, 9:
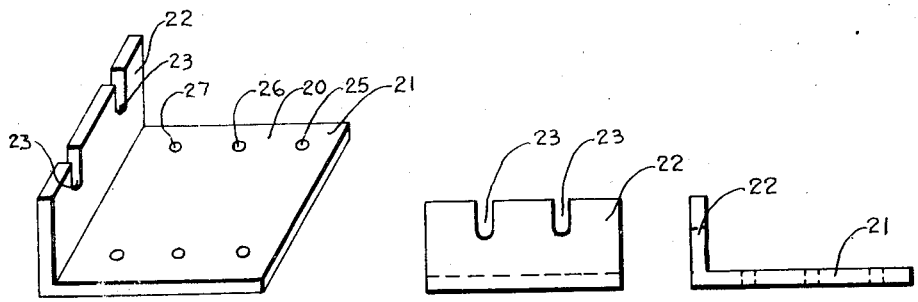
Figure 7 is a perspective view of an insulating plate.
Figure 8 is an end view of the insulating plate.
Figure 9 is the side elevation of the insulating plate.

With reference now to Figures 4, 5, and 6 of the drawings, plate 10 comprises a base portion 11 and a vertical flange at one end thereof, 12, in which at predetermined points are provided a pair of inverted U-shaped slots, or orifices, 13. Desirably the slots 13 will be relatively long and narrow for purposes hereinafter described. Desirably these slots or orifices may be punched out of the flange 12 in such a manner as to leave a pair of fins or flanges 14 which stand outwardly and rearwardly from the vertical flange 12 along both side walls of each of the slots 13. A plurality of holes 15 and a plurality of similar holes 16 are punched through the base 11 of the plate 10. Desirably the diameter of these holes are approximately the diameter of the shank of a suitable conventional rivet. A plurality of holes 17 of larger diameter than either holes 15 or 16 and of a size larger than the head of a conventional rivet are punched out of base 11. Desirably the edge 18 of the flange 12 will be rolled into a lip 18 as shown in Figure 6 of the drawings.

An insulating plate 20 of any suitable non-conducting material of approximate similarity with respect to its overall dimensions as compared to those of plate 4 is provided with a base 21 and a vertical flange or end 22 in which are provided a pair of U-shaped slots 23, 23 the width of each of which approximates the width of the slots 13. A plurality of holes 25, 26 and 27 are pierced through the base 21 of the insulating plate, these holes being all of approximately the same size as the holes 15 and 16. These holes are so placed as to be in alignment with holes 15, 16 and 17 when plate 20 is superimposed on top of plate 10.

Figures 10, 11, 12:
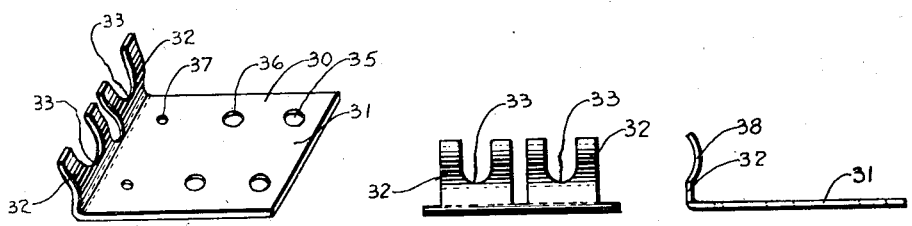
Figure 10 is a perspective view of a lower contact plate.
Figure 11 is the end view of this contact plate.
Figure 12 is a side elevation of the same plate.

Referring now to Figures 10, 11 and 12, it will be observed that contact plate 30 and a base 31 and a pair of vertically disposed ears 32, 32 at one end thereof. Each of the ears is provided with a U-shaped notch or slot 33 which is wider than slots 13 or 23. The ears 32 are desirably bent as shown at 38 to provide resilient, friction contact with battery terminals of selected size. Base 31 is provided with a plurality of aligned holes 35, 36 and 37 which are adapted for alignment with holes 15 and 25, 16 and 26, and 17 and 27, respectively.

When assembled as shown in Figures 1 and 12 it will be observed that contact plate 10 occupies the lowermost position adjacent base support 1 while insulation plate 20 is sandwiched between contact plate 10 and uppermost contact plate 30. It will also be observed from Figures 4 and 10 that holes 17, 35 and 36 are larger than any of the remaining holes 15, 16, 25, 26, 27 and 37, being in fact adapted to accommodate a suitable rivet-head without permitting electrical contact between the rivet-head and the inner periphery of said larger holes. Consequently, when rivets 55, 56, and 57 are inserted in place and headed, the rivets 55 hold contact plate 10 and insulating plate 20 closely together and hold the entire cradle in place on base support 1. Rivets 56 hold contact plate 10 and insulating plate 20 closely together. The upper heads of all rivets 55 and 56 are out of electrical and mechanical contact with contact plate 30. Rivets 57 hold insulating plate 20 and contact plate 30 closely together. The bottom heads of rivets 57 are out of electrical and mechanical contact with contact plate 10.

By means of suitable rivets 52 the bottom flange 51 of spring 50 is affixed to base support 1 at such a position as will insure that spring 50 exerts resilient pressure against the normally insulated bottom of the battery. It is desired that spring 50 be so tensioned and so positioned as to press against the base of the battery and hold the battery and hold the battery terminals in contact with the desired portions of vertical flanges 12 and 32 of contact plates 10 and 30.

Figure 3:
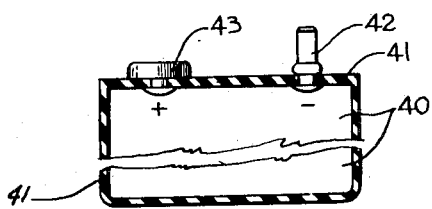
Figure 3 is a side elevational view, partly in cross-section of a multi-stack battery partially broken away and showing a terminal unit adopted for use in the cradle.

Turning now to Figure 3 of the drawing, there will be seen one arrangement of battery terminals adapted for use with the battery cradle of the invention. In Figure 3, 40 represents generally the battery which is preferably comprised of a plurality of substantially parallel stacks, each stack comprising a plurality of superimposed individual cells. By suitably arranging the cells in each stack and by providing suitable conductor bars or elements (not shown) the negative pole of the battery composite may make contact with a negative terminal 42 and the positive pole of the battery composite may make contact with a positive terminal 43. Desirably the several stacks of cells and the suitable conductor bars or elements (not shown but generally represented by 40) are encased or sheathed in an insulating coating 41. Desirably negative terminal 42 is a relatively elongated cylindrical post having an annular shoulder and a rivet head adapted to penetrate and hold the post in place on the insulating coating 41. The rivet head on the post is positioned below the coating 41 and in contact with the negative pole of the battery composite. Desirably positive terminal 43 is a relatively flattened circular disc likewise provided with a rivet head adapted to hold the disc in place on the insulating coating and in contact, below the coating, with the positive pole of the battery composite.

Figure 13:
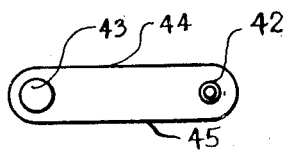
Figure 13 is a top view of a typical multi-stack battery.

Figure 13 shows a top view of a battery such as is particularly shown in Figure 3 and wherein for reference in this specification one side of the battery has been designated 44 while the opposite side designated 45.

The diameter, taken through any horizontal plane, of terminal 42 is such, and its position with respect to the sides and edges of the battery is such that when either side 44 or 45 of the battery is placed on the cradle, terminal 42 will be out of contact with any edge of either of notches 33 on contact plate 30. However, the said horizontal diameter of terminal 42 and its length will permit terminal 42 to be placed in fairly snug engagement with slots 23 of insulating plate 20 and with the sides of slots 13 of contact plate 10. It will be observed that the depth of slots 23 in insulating plate 20 is less than the depth of slots 33 in upper contact plate 30 so that slots 23 will tend to support terminal 42 above and out of short-circuiting contact with the troughs of slots 33. It will also be observed that the inverted U-shape of slots 13 in contact plate 10 provides an upper contact surface (the inverted base of the U) in addition to the sides of the slot and additionally provides a restraining stop against undesired vertical movement of terminal 42. To provide additional lateral surface, the lateral edges 14 of slots 13 are flanged outwardly and thus insure contact with the sides of terminal 42 when inserted therebetween.

The diameter, taken through a horizontal plane, of terminal 43 is such that it cannot penetrate between the walls of either of slots 33 and its flattened heighth is such that it is adapted to contact the outwardly struck portions of one of the ears 32.

It is thus apparent that regardless of which side 44 or 45 of the battery is laid lowermost on the cradle, the battery will be insulated from contact plate 30 and spring clip 50 by its insulating covering. Terminal 42 will be out of contact with any part of flange 32 but will be in desired contact with the walls of a slot 13 on flange 12. Similarly, terminal 43 will invariably be in contact with one of the ears 32. Thus by connecting plate 10 to a suitable positive lead wire leading to the positive side of a radio, or hearing aid circuit and by connecting plate 30 to a suitable negative lead wire of such circuit constant polarity is always insured even when the battery is placed on the cradle by one completely unskilled in the art. Moreover, the battery will be held in place and in desired contact relationship, secured against undesired horizontal or lateral displacement.

I claim:

1. A constant polarity battery cradle, adapted for use with flattened, dry cell batteries which have both battery terminals at the same end of the battery, said cradle comprising a pair of flanged contact plates, the bases and flanges of which are insulated by a flanged insulating plate, the said three plates being arranged as superimposed laminations, a plurality of coacting slots in the flanges of each of the said three plates, the said slots being so proportioned as to insure electrical contact between one of the battery terminals and the outermost contact plate and to insure electrical contact between the other of said battery terminals and the innermost contact plate whenever either flattened side of said battery is placed on said cradle.

2. A constant polarity battery cradle, adapted for use with flattened dry cell batteries which have both battery terminals at the same end of the battery, said cradle comprising a pair of flanged contact plates, the bases and flanges of which are insulated by a flanged insulating plate, the said three plates being arranged as superimposed laminations, a plurality of coacting slots in the flanges of each of the said three plates, the said slots being so proportioned as to insure electrical contact between one of the battery terminals and the outermost contact plate and to insure electrical contact between the other of said battery terminals and the innermost contact plate whenever either flattened side of said battery is placed on said cradle, and resilient means adapted to urge said battery and its terminals toward said slotted flanges.

3. A constant polarity battery cradle, adapted for use with flattened dry cell batteries which have both battery terminals at the same end of the battery, said cradle comprising a contact plate having a vertical flange at one end thereof, a plurality of slots in said flange, an insulating plate having a vertical flange at one end thereof and adapted to be superimposed on said contact plate, another contact plate having a vertical flange at one end thereof and being adapted to be superimposed on said insulating plate, slots in the flanges of said insulating plate and said other contact plate, said slots being adapted to register in part with the slots of said first contact plate, the slots on said superimposed other contact plate being wider than said other slots and being deeper than the slots in said insulating plate.

4. A constant polarity battery cradle, adapted for use with flattened dry cell batteries which have both battery terminals at the same end of the battery, said cradle comprising a contact plate having a vertical flange at one end thereof, a plurality of slots in said flange, an insulating plate having a vertical flange at one end thereof and adapted to be superimposed on said contact plate, another contact plate having a vertical flange at one end thereof and being adapted to be superimposed on said insulating plate, slots in the flanges of said insulating plate and said other contact plate, said slots being adapted to register in part with the slots of said first contact plate, the slots on said superimposed other contact plate being wider than said other slots and being deeper than the slots in said insulating plate, and resilient battery supporting means disposed adjacent said plates at the ends thereof remote from said flanges.

5. A constant polarity battery cradle, adapted for use with flattened dry cell batteries which have both battery terminals at the same end of the battery, said cradle comprising a first conducting plate, a superimposed insulating plate and a second conducting plate superimposed on said insulating plate, each of said three plates having an integral vertical flange at the same end thereof, a pair of slots in the flange of said first conducting plate, a pair of slots in the flange of said insulating plate, said slots being of substantially the same width as said slots in said first conducting plate, a pair of slots in the flange of said second conducting plate, said slots being relatively wider and deeper than the slots in said insulating plate.

6. The device defined in claim 5 wherein a resilient battery restraining member is associated with said three plates at the ends thereof remote from said flanges.

7. The device defined in claim 6 wherein the slots in said first conducting plate are inverted U-shaped and provided with lateral fins along the vertical edges thereof.

8. The device defined in claim 7 wherein the slots in said insulating plate are U-shaped and wherein the base of each slot terminates below the inverted base of the slots in said first conducting plate.

9. The device defined in claim 8 wherein the vertical flange of said second conducting plate is bifurcated to provide a pair of ears.

10. The device defined in claim 9 wherein each of said ears is crimped to provide a resilient contact surface.

11. The device defined in claim 10 wherein the slots in said second conducting plate are U-shaped and each said slot is substantially centered in one of said ears.

CLIFFORD G. NELSON.

REFERENCES CITED

The following references are of record in the file of this patent:

UNITED STATES PATENTS

| Number | Name | Date |
|---|---|---|
| 1,471,739 | Kammerhoff | Oct. 23, 1923 |
| 2,449,550 | Eichberg et al. | Sept. 21, 1948 |

FOREIGN PATENTS

| Number | Country | Date |
|---|---|---|
| 39,355 | Denmark (Dam) | Oct. 2, 1928 |